United States Statutory Invention Registration [19]

[11] Reg. Number: H135

Wallace et al.

[45] Published: Sep. 2, 1986

[54] ELECTROMAGNETIC LEVITATION CASTING APPARATUS HAVING IMPROVED LEVITATION COIL ASSEMBLY

[76] Inventors: John P. Wallace, 229 Park Ave., Broadway, Va. 22815; Hugh R. Lowry, 700 Towne House Ave., Fairfield, Conn. 06430

[21] Appl. No.: 622,131

[22] Filed: Jun. 19, 1984

[51] Int. Cl.[4] ..... B22D 11/0; B22D 27/02

[52] U.S. Cl. ..... 164/502; 164/466

[58] Field of Search ..... 164/466–468, 164/502–504

[56] References Cited

U.S. PATENT DOCUMENTS 3,872,379 3/1975 Brooks et al. ..... 324/242
4,294,304 10/1981 Delassus ..... 164/504
4,414,285 11/1983 Lowry et al. ..... 164/466 X

FOREIGN PATENT DOCUMENTS 48-5413 2/1973 Japan ..... 164/502

*Primary Examiner*—John F. Terapane
*Assistant Examiner*—Eric Jorgensen

[57] ABSTRACT

An electromagnetic levitation casting apparatus having an improved levitation coil assembly employing flux concentration devices, is provided. The improved levitation coil assembly comprises a plurality of slotted annular slugs surrounding a tubular casting vessel within which a liquid metal column is to be levitated and solidified by cooling pursuant to the General Electric Levitation Casting (GELEC (TM)) process. Each of the slotted annular slugs is inductively coupled to a respective electromagnetic field producing coil having a large number of turns surrounding the slug. Each slotted annular slug serves to concentrate the magnetic field produced by its associated primary mutli-turn coil to substantially the interior cross sectional area of the tubular casting vessel it surrounds and functions as a current step-up transformer. A separate slotted annular slug and associated surrounding electromagnetic multi-turn field producing coil is provided for each phase winding of the multi-phase excitation employed in the improved levitation coil assembly.

33 Claims, 9 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

43
38
39
41
42
25
37
36
33
36A
26
27
3 PHASE A.C. CURRENT SUPPLY AND CONTROLLER
FREQUENCY CONTROL
POWER CONTROL
28
12A
35
12B
12C
34
32
31

15
11
51
14

22
25
19
33
35
11A
12
12A
12(-B')
12C
12(-A')
12B
12(-C')
11(-B')
11C
11(-A')
11B
11(-C')
24
26
27
3 PHASE A.C. CURRENT SUPPLY AND CONTROLLER
FREQUENCY CONTROL
POWER CONTROL
28
34
23

ELECTROMAGNETIC LEVITATION CASTING APPARATUS HAVING IMPROVED LEVITATION COIL ASSEMBLY

TECHNICAL FIELD

This invention relates to an improved apparatus for the casting of continuous metal rods.

More specifically, the invention relates to an electromagnetic levitation casting apparatus having an improved levitation coil assembly for the continuous casting of metals in long lengths using an electromagnetic levitation casting process described in U.S. Pat. No. 4,414,285—issued Nov. 8, 1983 for "Continuous Metal Casting Method, Apparatus and Product"—Hugh R. Lowry and Robert T. Frost, inventors, and assigned to the General Electric Company.

BACKGROUND PRIOR ART PROBLEM

The above-referenced U.S. patent discloses and claims a unique process for the continuous casting of metal rod in the presence of a levitating electromagnetic field which is used to overcome frictional, adhesive and gravitational forces normally acting on the cast rod as it solidifies from the molten state. For this purpose, a multiturn coil connected to a polyphase source of electrical energy is employed to provide the levitating electromagnetic field that acts on a molten metal column contained within a tubular heat exchanger/casting vessel as it solidifies. The levitation electromagnetic field is in the form of an upwardly travelling electromagnetic field that both constrains the molten metal column and maintains it in a substantially weightless condition with reduced hydrostatic head in the solidification region of the heat exchanger/casting vessel whereby the solidified rod product can be continuously withdrawn by a rod removal mechanism acting on the solidified rod product after it has passed through the heat exchanger/-casting vessel.

The construction and operation of an electromagnetic levitation casting apparatus having the above-described capabilities and designed for operation at the high power levels required and in the high temperature environment encountered, presents several problems.

The General Electric levitation casting process (hereinafter referred to as the GELEC (TM) process) requires a strong, upward travelling electromagnetic field to be created in the interior of the tubular casting vessel/heat exchanger assembly which supports and contains the liquid metal column while it is solidifying. In the type of levitating apparatus built to date for practicing this process, the levitating field is generated by currents in the range of 500–1,000 amperes flowing in a 36-turn levitation coil. Since reasonably sized insulated wires cannot carry such currents continuously, water cooled copper tubing currently is used for the levitation coil. This coil is placed in close proximity to the exterior wall of the heat exchanger which in turn surrounds a tubular casting vessel made of refractory material. Such a coil maximizes the magnetic field intensity within the interior of the tubular casting vessel.

The necessity to provide for an adequate cooling water flow through the copper tubing forming the coil while also making electrical connections to the tubing from the cables or bus bars that carry the heavy energizing currents, presents many problems from a mechanical and electrical engineering standpoint. Additionally, since a magnetic levitation coil made from copper tubing must consist of only a relatively low number of turns (typically 3 turns per phase), the resulting levitating magnetic field is not completely uniform. This non-uniformity is believed to produce slight non-homogenity in grain structure occassionally observed in the cast rod produced by the process.

A practical solid state generator of high frequency polyphase power in the range of 10–50 kilowatts has an output voltage of roughly 100–500 volts. This high voltage, low current output must go through a step-down transformer with forced air or water cooling in order to produce the low voltage, high current required to energize the present levitation coil design described briefly above. A high frequency 10–50 kilowatt, three phase step-down transformer (or three single phase transformers) is expensive, large and somewhat difficult to design and fabricate. Further, the step-down transformer and associated high current supply cables or bus bars feeding the levitation coil assembly used to date have not been entirely satisfactory and a simpler, less expensive design is very desirable.

To overcome these difficulties with an efficient and economical structure, the present invention was devised The present invention provides a unique and non-obvious solution to the above-discussed problems through the use of an improved levitation coil assembly that makes use of a novel arrangement of flux concentration devices. While the use of flux concentration devices in the production of large magnetic fields in order to improve the coil life of multi-turn coils used to produce the large magnetic fields has been described in the prior art, it has not been used or suggested for use heretofore with respect to the electromagnetic levitation of molten metals. One prior art description of a flux concentrator appears in an article entitled "Flux Concentrator For High Intensity Pulsed Magnetic Field" by Y. B. Kim and E. D. Platner in the Review of Scientific Instruments—7/59—pages 524–533. A different form of flux concentration device for use in eddy-current testing apparatus is disclosed in U.S. Pat. No. 3,872,379—issued Mar. 18, 1975 for "Eddy Current Testing Apparatus Using Slotted Mono-Turn Conductive Members"—John P. Wallace and Robert A Brooks—inventors.

In practicing the present invention a unique and non-obvious levitation coil assembly employing flux concentration devices for use in the electromagnetic levitation of molten metal is provided and comprises a plurality of slotted annular slugs surrounding a tubular casting vessel within which a liquid metal column is to be levitated and solidified by cooling pursuant to the GELEC (TM) process. Each of the slotted annular slugs is inductively coupled to an electromagnetic field producing coil having a large number of turns surrounding the slug. Each slotted annular slug serves to concentrate the magnetic field produced by the coil to substantially the interior cross sectional area of the tubular casting vessel it surrounds, and functions as a current step-up transformer. A separate slotted annular slug (or stack of thin slugs) and associated surrounding electromagnetic field producing coil is provided for each phase of the multiphase excitation provided for the GELEC (TM) levitation coil assembly.

The use of the slotted annular slug magnetic flux concentrator devices provides a number of important and non-obvious advantages. One advantage is that it will minimize or eliminate coil induced field variations caused by inevitable variations in the construction of multi-turn liquid cooled copper tube coils used heretofore. A further advantage is that the slotted annular slug members will be uniformly closer to the cast metal column and will increase the electromechanical restoring force on the column thereby allowing better control of the cast metal column diameter. Additionally, and equally important is that the improved levitator assembly using the slotted annular slug flux concentrators allows a higher levitating magnetic field to be generated with a lower impedance device. This in turn reduces the voltage requirements for the levitator coil assembly and the total power requirements and provides greater electrical efficiency. For example, a 40% decrease in impedance would reduce both the required driving voltage and input power by 40%. Due to the addition of the flux concentrator device the flux density at the inside periphery of the energizing coil is effectively transferred to, and reproduced at, the inner periphery of the central opening in the flux concentrator disk. This displacement of the flux from the energizing coil periphery to the disk inner periphery of the central opening in the disk (i.e., the surface closest to the levitated metal) is precisely what is desired in the GELEC (TM) process. Lastly, the flux density at the center of the coil is higher with the flux concentrator disk in place than without it, which is desirable. Even more important, however, is that the gradient (i.e., change in flux density with distance) of the flux from the center point outward is also much higher with the flux concentrator disk in place. The gradient of the flux is what determines the inward containment pressure on the levitated metal column so a higher value of gradient is desirable.

In the existing GELEC (TM) apparatus, the input impedance of the levitator coil changes considerably when the molten copper rises up into the levitator coil/-heat exchanger assembly at the start of a casting run. This impedance change is caused by the electrical load coupled into the levitator coil when copper (molten and solidified) exists in the interior of the coil. A desired value of the levitator coil current set before the run by adjusting the inverter output voltage must therefore be reset quickly to the desired value after the start of the run because of this change in coil impedance. The addition of the flux concentrator device virtually eliminates this problem because the highly conductive disks will have already lowered the energizing coil impedance drastically and introduction of molten metal in close proximity to the central opening of the concentrator disks will have little or no further effect on the energizing coil impedance. The flux concentrator device therefore makes it possible to more accurately set an optimum levitator coil current before casting starts and hold this value of current during the critical start-up operation.

BRIEF DESCRIPTION OF DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference characters, and wherein.

BEST MODE OF PRACTICING THE INVENTION

Figure 1:
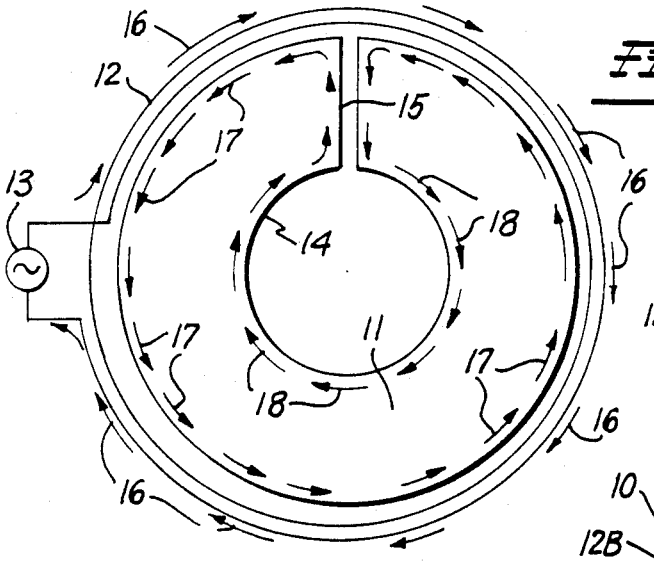
FIG. 1 is a diagramatic sketch of a slotted, annular slug flux concentrator device employed in constructing an improved electromagnetic levitating coil assembly according to the invention.

FIG. 1 is a planar end view showing a slotted annular slug 11 surrounded by a multi-turn coil 12 of insulated wire which surrounds the outer periphery of annular slug 11. The multi-turn coil 12 is excited from an alternating current power source 13. A central opening 14 is formed in annular slug 11 and a non-conductive slot 15 extends from the outer periphery of slug 11 all the way through to central opening 14. An instantaneous current flow through the outer primary multi-turn coil 12 in the direction indicated by the arrows 16 induces an opposite current flow around the outer periphery of annular slug 11 indicated by the arrows 17. Since the ampere-turns in slug 11 must essentially equal the ampere-turns in the energizing primary coil 12, the current flow in the slug 11 (which is the equivalent of a single-turn secondary coil) will be very large. Without a non-conductive slot as shown at 15 in the slug, the current 17 would be equally high but, because of the skin effect phenomena, would flow predominately near the outer edge of the disc and the electromagnetic field produced within the interior central opening 14 would be minimal. However, the existence of the non-conductive slot 15 through the annular slug from the central opening 14 to the outer periphery of the slug forces the current flow in the slug to travel along the sides of the slot 15 and around the periphery of the central opening in the manner shown by the arrows 18. By thus forcing the current to flow around the periphery of the central opening 14, a desired high electromagnetic field is produced within the central opening 14.

In essence then, the outer multi-turn primary energizing coil 12 and slotted slug arrangement 11 acts as a current step-up transformer so that a high voltage, low current energizing coil 12 of relatively large diameter and having a large number of turns will produce a low voltage, high current flow around the central opening 14 of annular slug 11. Opening 14 is much smaller in diameter than coil 12 and hence creates a high magnetic flux within the central opening. It is this highly concentrated, central magnetic flux which is needed for practicing the GELEC (TM) process.

From the foregoing description, it will be appreciated that the field producing current flow that provides the levitating electromagnetic force necessary in the GELEC (TM) process is essentially the flow around the inner periphery of central opening 14 of slotted annular slug 11. This feature provides a major advantage in that the apparent inner diameter of the energizing coil that produces the levitating field is reduced by the insertion of the slotted annular slug as if it were replaced by a coil of the same number of turns per meter, but with the inner diameter of the slotted annular slug 11. This allows a higher magnetic field to be generated with a lower impedance device and reduces the total power requirement of the energizing source. The annular slotted slug member 11 therefore acts as a flux concentrator and effectively increases the flux produced by the multi-turn coil by a factor substantially equal to the total area of multi-turn coil 12 cross section divided by the inside area of central opening 14.

Figure 2:
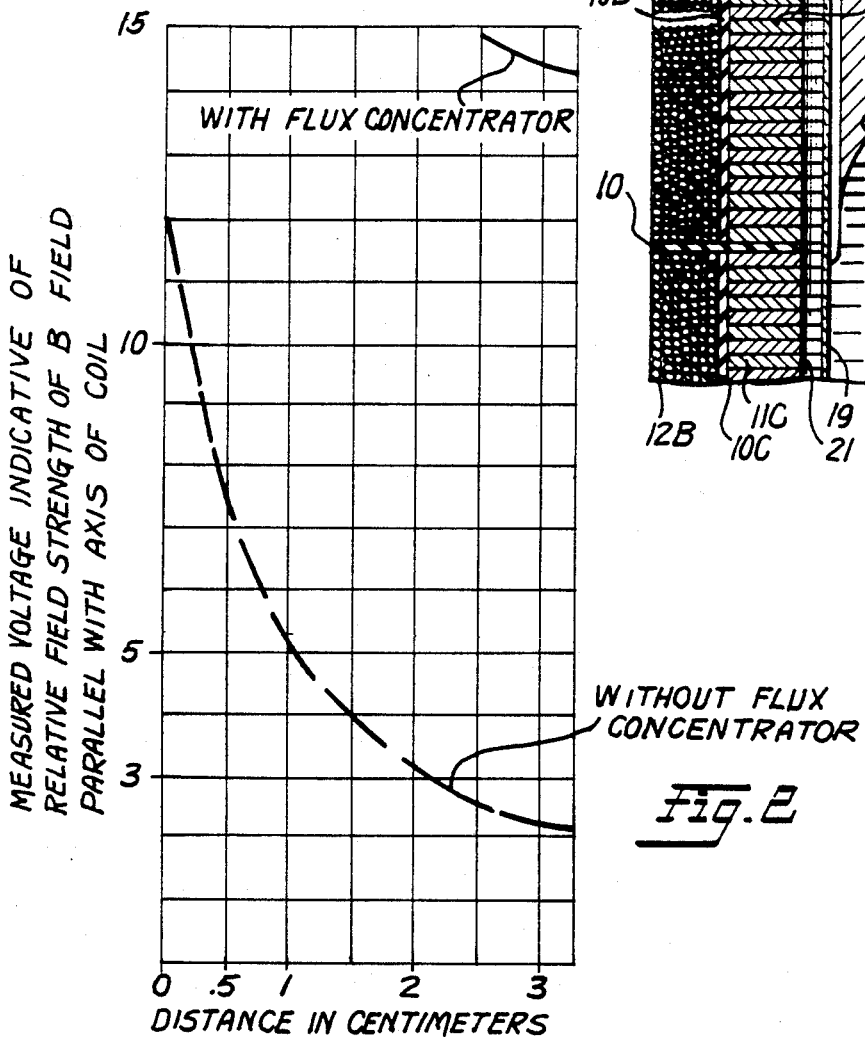
FIG. 2 is a voltage versus distance characteristic curve indicative of the flux field of a multi-turn electromagnetic induction coil and illustrates the difference in flux concentration achieved where the coil has only an open air center as opposed to a coil having a slotted annular slug flux concentrator such as shown in FIG. 1, inserted therein.

The results of measurement tests run with a magnetic field sensing probe on the concentrating effects of a slotted annular slug member 11 is shown in FIG. 2 of the drawings. In FIG. 2, the curve shown in dotted line illustrates the magnetic field flux density B measured in Gausses from the center of a multi-turn coil such as 12 without the presence of a field concentrating slotted annular slug member 11. The curve shown in solid line in the upper right corner of FIG. 2 illustrates the results of the measurements taken after insertion of a slotted annular field concentrator 11. This data was taken with respect to a multi-turn energizing coil having ten turns wound in a planar loop having a 6.5 centimeter diameter. The slotted annular slug member 11 of copper had a corresponding 6.5 cm outer diameter, a 1.5 cm diameter central opening and was 0.6 cm thick. The multi-turn coil was excited by a 1.0 microsecond pulse repeated at a frequency of one kilohertz. From FIG. 2, it will be seen that the introduction of the slotted annular slug member 11 results in a large integrated increase in flux within the central opening 14.

In an improved levitation coil assembly for the GELEC (TM) apparatus, the levitating field producing current flow that will drive the metal casting process is essentially the flow around the central opening 14 of the slotted annular slug member 11. This provides a major advantage over previously used multi-turn coil driving arrangements in that the current flow path is not constrained so that the current flow path and resulting electromagnetic force it produces can concentrate at those points around the periphery of the central opening 14 where the molten metal column passing through opening 14 has a larger diameter. This in effect increases the apparent stiffness of the containment effects of the levitating electromagnetic fields acting as a mold and should assist in decreasing the mean variation in the cast solidified rod product diameter.

Figure 3:
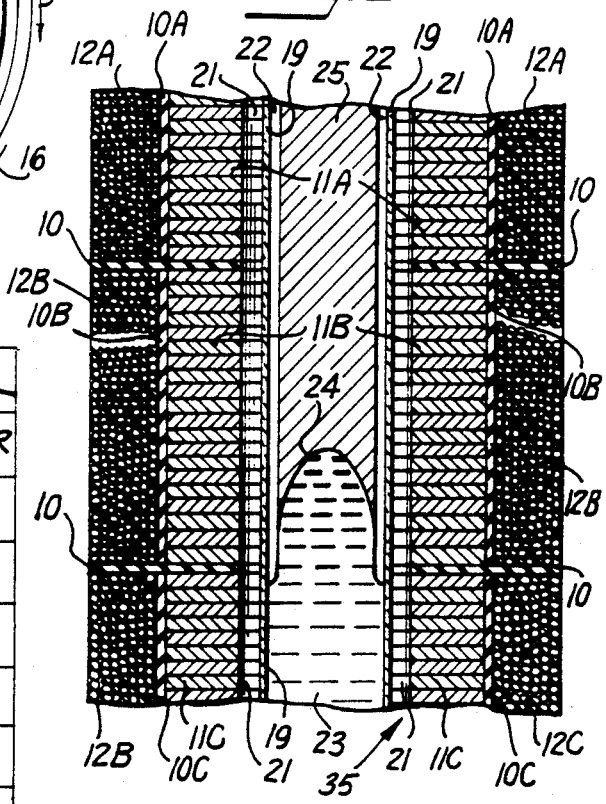
FIG. 3 is a cross sectional view of one embodiment of an improved levitation coil assembly constructed according to the invention.

FIG. 3 of the drawings illustrates a preferred construction for an improved levitation coil assembly for use in the GELEC (TM) apparatus which employs a plurality of slotted annular slug members such as shown in FIG. 1 as flux concentration devices. In FIG. 3 an elongated tubular casting vessel is shown at 19 which is fabricated from a high temperature refractory material such as, but not limited to, ceramics, graphite, zirconia or the like. Casting vessel 19 is cooled by an annular liquid cooled heat exchanger 21 that immediately surrounds tubular casting vessel 19. As will be explained hereafter with respect to FIG. 4, means are provided for continuously supplying a liquid coolant through the annular heat exchanger 21. Concurrently, liquid metal shown at 23 is delivered into the lower end of tubular casting vessel 19 where it rises. As the molten metal 23 rises in the tubular casting vessel 19 it will be levitated by the levitating electromagnetic field and cooled substantially at a molten metal-solidified metal interface shown at 24 and thereafter can be withdrawn from the top portion of tubular casting vessel 19 as solidified rod product 25. The manner in which the solidified rod product 25 is withdrawn also will be described more fully hereafter with respect to FIG. 4 of the drawings. A small gap indicated at 22 is created between the exterior surfaces of the levitated metal column 23 and the interior surrounding surfaces of the tubular casting vessel 19 by the containment effect of the electromagnetic field. When the liquid metal column solidifies it will further shrink in diameter thus maintaining this gap as the rod cools.

Around the solidification region indicated at 24, electromagnetic levitation field producing means are provided. This means is comprised by a novel levitator coil flux concentrator assembly according to the invention for producing an electromagnetic levitation field that reduces the hydrostatic head of the liquid metal column in the solidification region 24 and maintains the liquid metal column in a substantially weightless condition within this region while simultaneously maintaining a predetermined dimensional relationship between the outer surface of the liquid metal column and the interior surrounding surfaces of the casting vessel 19 by the containment affect of the levitating electromagnetic field. For this purpose, means (to be described hereafter with relation to FIG. 4) are provided for establishing and maintaining the value of the electromagnetic field so that the cross sectional dimension of the liquid metal colum 23 is sufficiently large to preclude formation of a substantial gap that would introduce high thermal losses between the outer surfaces of the liquid metal column and the interior surrounding surfaces of the tubular casting vessel 19. Operation of the levitator coil assembly in this manner assures optimum heat transfer between the liquid metal column 23 and the liquid cooled tubular casting vessel 19 while simultaneously reducing frictional, adhesive and gravitational forces acting on the liquid metal column to a minimum. From this description it will be appreciated that the tubular casting vessel 19 serves not only as a casting vessel but also as a heat exchanger. Accordingly, hereafter, this component will be referred to as tubular casting vessel/heat exchanger 19, 21.

The new and improved levitator assembly shown in FIG. 3 is comprised by a plurality of slotted arrays of annular slugs shown at 11A, 11B and 11C which surround the portion of the length of the tubular casting vessel/heat exchanger 19, 21 within which the liquid metal column is to be levitated while simultaneously being cooled. In the embodiment of the invention shown in FIG. 3, each of the slotted annular slug arrays 11A, 11B and 11C is comprised by a stacked array of slotted annular unitary monolithic discs or slugs which are electrically insulated one from the other and are similar in construction to the slotted annular member shown in FIG. 1. The number and thickness of the slotted annular discs 11 in each of the slug arrays 11A, 11B, 11C may vary in accordance with design criteria for a particular installation. Each monolithic slug is provided with a thin electrical insulating coating which in the case of aluminum slugs may comprise an anodized layer of aluminum oxide. Each of the slug arrays 11A, 11B, 11C thus comprised are also electrically insulated from each other by insulating members 10.

Each of the respective slug arrays 11A, 11B and 11C are inductively coupled to an associated multi-turn electromagnetic field producing coil such as 12A, 12B or 12C with the multi-turn coils being formed from a large number of turns of insulated wire which may optionally be further insulated from the exterior circumferential surfaces of the respective associated slug member 11A, 11B or 11C by respective cylindrically shaped insulated surfaces 10A, 10B or 10C in the manner shown in FIG. 3. In operation, each of the respective multi-turn windings 12A, 12B and 12C is excited with a respective phase excitation current supplied from a multi-phase power source as will be described hereafter with relation to FIG. 4. The slug arrays 11A, 11B and 11C will operate in the manner described above with relation to FIG. 1 as a current step-up transformer for converting the relatively high voltage, low current supplied to the respective phase windings 12A, 12B and 12C to a low voltage, high current that flows around the periphery of central opening 14. This high current produces a concentrated flux passing through the central openings of the respective slug array and acts on the liquid metal column 23 contained in the tubular casting vessel/heat exchanger 19, 21. Due to the phasing of the excitation of the respective coil assemblies 12A, 12B and 12C, an upwardly travelling electromagnetic wave is produced which acts on liquid metal column 23 in the solidification region 24 so as to maintain the liquid metal column in this region in a substantially weightless condition and which simultaneously provides a containment field effect that maintains a minimal gap space between the exterior surfaces of the liquid metal column 23 and the interior surfaces of the tubular casting vessel/heat exchanger 19, 21.

Figure 4:
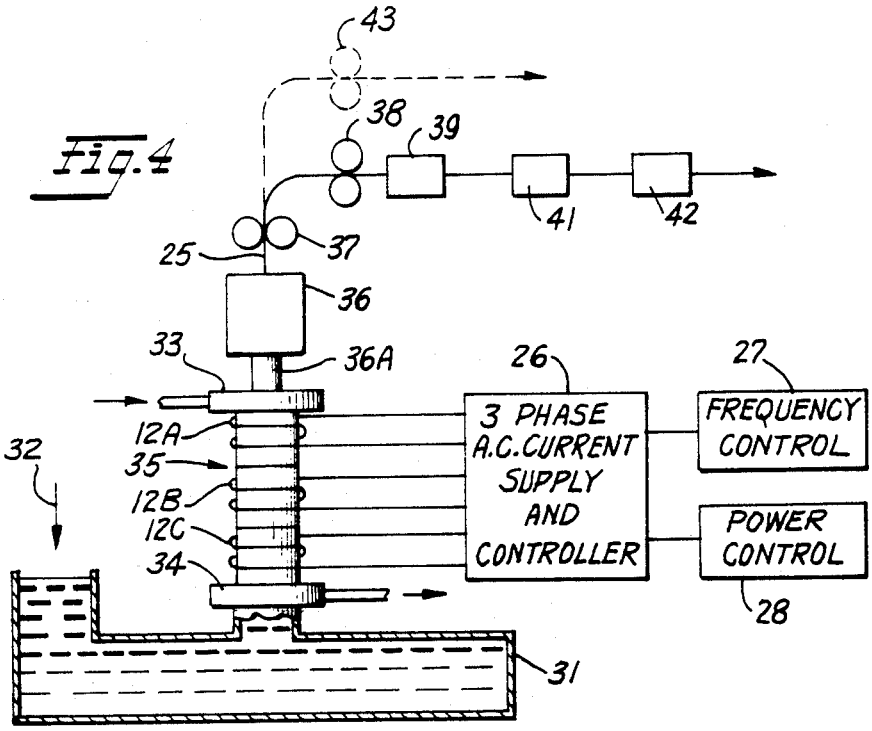
FIG. 4 is a schematic functional block diagram of an electromagnetic levitation casting apparatus having an improved levitation coil assembly constructed according to the invention.

Referring to FIG. 4, molten metal to be cast is contained in a holding furnace (not shown) from which it is delivered into a casting crucible 31 as shown by the arrow 32 on an as required basis to maintain a desired level of liquid metal within the casting assembly 35 comprised by the tubular casting vessel/heat exchanger portion 19, 21 and slotted annular slug member assembly 11A, 11B, 11C and surrounding multi-turn coils 12A, 12B and 12C described with relation to FIG. 3. The casting assembly 35 is mounted on and extends vertically upward from crucible 10 to an open upper end through which the freshly cast solidified rod product 25 is withdrawn by means for removing solidified metal and for controlling the rate of production of solidified metal comprised by a withdrawal assembly for supplying the solidified metal to a precooling station 36 via an intermediate quenching station 36A. From the precooling station 36 the freshly cast and precooled solidified rod product 25 may be delivered via withdrawal rolls 37 and 38 to tandem hot-rolling stations 39 and 41 (should such be required) and then finally cooled to ambient temperature and coiled at a coiling station 42 for storage and delivery to a user of the cast product. Alternatively, the solidified rod product 25 can be withdrawn by withdrawal rolls 37 and 43, cooled to ambient temperature and then stored without further processing. By controlling the rate of withdrawal of the solidified metal product with withdrawal rolls 37, 38 or 37, 43, the rate of production of solidified metal product is controlled.

In operation, molten metal is displaced from crucible 31 as a liquid metal column such as shown at 23 in FIG. 3 into the casting assembly 35 by gravity or pressurized flow from the holding furnace (not shown). The holding furnace delivers the molten metal into crucible 31 at intervals or continuously as necessary during the continuous casting process. The molten metal column 23 (FIG. 3) is thus initially established and thereafter maintained at a level above that at which the upwardly travelling levitation electromagnetic wave produced by the levitator coil assembly becomes effective to reduce or even eliminate the column hydrostatic head. The upwardly travelling, levitation electromagnetic waves are produced in the manner described previously with respect to FIG. 3 as a result of multi-phase excitation currents supplied to the respective multi-turn inductor winding coils 12A, 12B and 12C from a three phase AC current supply and controller 26. Controller 26 is controlled independently in frequency and power by a respective frequency control circuit 27 and power control circuit 28 of known construction.

Figure 5:
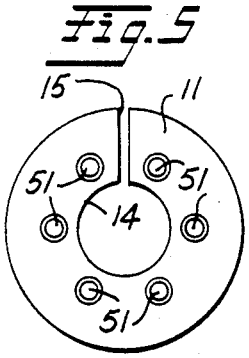
FIG. 5 is a plan view of an alternative construction for a slotted annular slug flux concentrator employed in fabricating an alternative form of the improved levitation coil assembly shown in cross section in FIG. 6.
Figure 6:
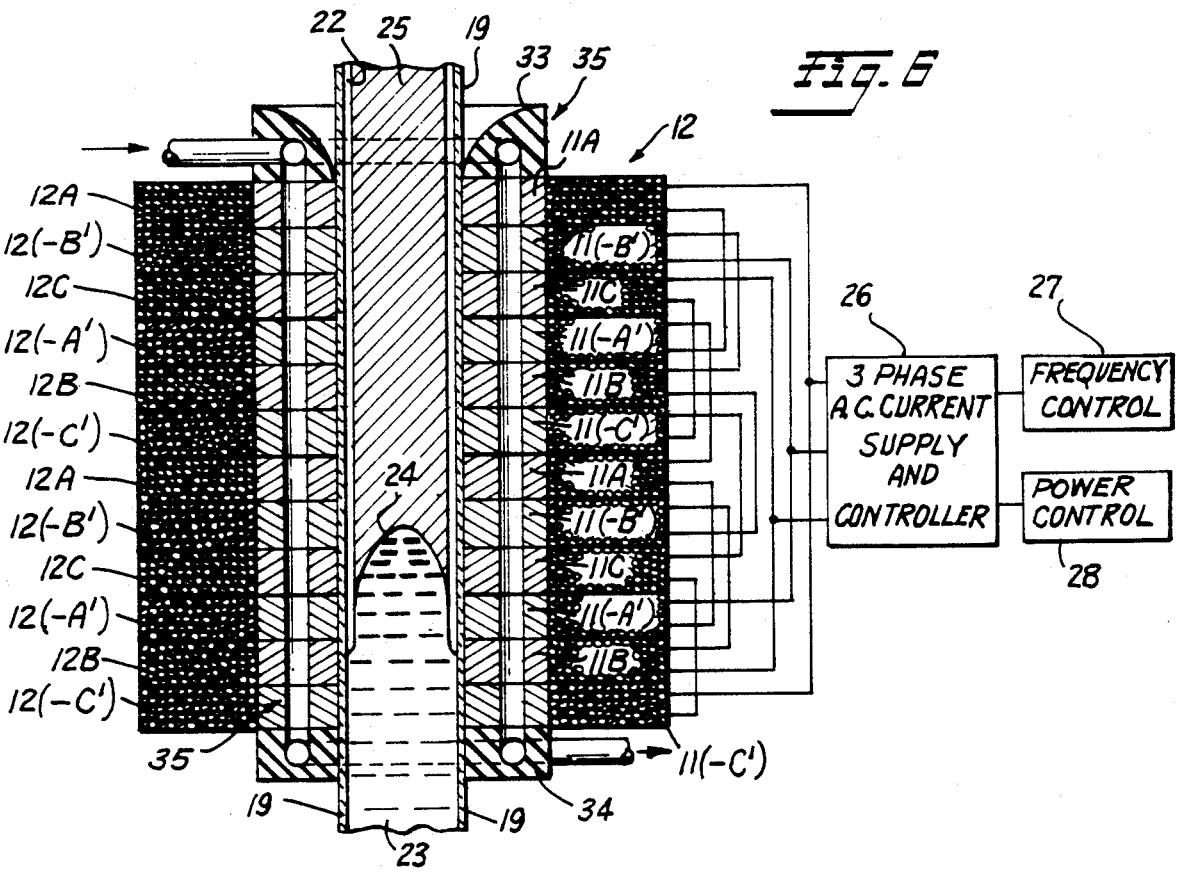

While a three phase arrangement has been shown in FIG. 4 for simplicity of illustration, six phase excitation of the levitating coil assembly is preferred. However, it is believed obvious to those skilled in the art that other multi-phase power supply systems and coil arrangements could be employed. For example, as shown in FIG. 6, twelve multi-turn coils 12A, 12(-B'), 12C, 12(-A'), 12B and 12(-C'), repeated a second time, are disposed in vertical spaced relationship around the improved levitation coil assembly 35 as windings arranged substantially normal to the casting vessel/heat exchanger tube 19 axis. These coils are electrically interconnected to form a serially arranged, two-six phase coil system that physically extends over two wavelengths at the excitation frequency of the coils to thereby determine the length of the levitation zone. Such an arrangement also is illustrated schematically in FIG. 5 of the above referenced U.S. Pat. No. 4,414,285, the disclosure of which is hereby incorporated into this application in its entirety, but is described as a twelve phase system. If it is desired to employ only a single, six phase coil system extending over a single wavelength of the excitation frequency of the coils, then the number of multi-turn coils 12A, 12(-B'), etc., shown in FIG. 6 would be reduced to only a single set of such coils and the electrical interconnections to the second set of coils eliminated. Other coil arrangments employing interconnected groups of three, four or other interconnected groups of phase winding combinations will be obvious to those skilled in the art in the light of the above disclosure.

The improved multiphase levitator coil assembly described above produces a progressive upwardly travelling wave which will move at a speed proportional to the distance between successive closed flux loops and the frequency of excitation. The primary multi-turn excitation windings 12A, 12B and 12C are arrayed vertically upward along the length of the levitator tube assembly 35 so that the liquid metal column and newly solidified metal product in all but the lowermost section of levitator tube assembly 35 can be levitated throughout the casting operation to a substantially weightless condition. In this condition the liquid metal column 23 has substantially a zero hydrostatic head within the solidification region of levitator tube 35 so that the liquid metal column is substantially pressureless. By pressureless, it is meant that there is no substantial continuous pressure contact between the outer surface of the liquid metal column and the interior surrounding surfaces of the casting vessel 19 and the liquid metal column is without substantial hydrostatic head in the critical solidification zone 24. As a result, frictional and adhesive forces as well as the force of gravity acting on the solidifying column are reduced to a minimum in the solidification zone.

In order to limit the size of the casting equipment and particularly the length of the levitator tube assembly 35 and also minimize the power input requirement to maintain the liquid metal column weightless through the solidification region, maximum heat exchange effectiveness is desireable. The heat exchanger arrangement shown in FIG. 3 provides in effect a condition approaching a water quench by effectively enveloping the rising liquid metal column 23 in a continuous (during operation), rapidly flowing, turbulent but fairly small cross section annular stream of liquid coolant supplied via the upper manifold or header 33 and drained through the lower header 34. The heat flow across the small gap between the liquid metal column 23 and surrounding graphite tube 19 that bears against the cylindrical surface of the inner wall of annular heat exchanger 21, made from stainless steel or other similar material, is highly effective. This heat transfer capability can be further enhanced by the inclusion of short, internal, annular ribs within annular cooling chamber 21 which serve as barriers to laminar flow of the liquid coolant, causing turbulence in the cooling liquid as it travels downwardly through the annular heat exchanger from the upper manifold 33 to the lower manifold 34.

The inside diameter of the tubular graphite casting vessel 19 shown in FIG. 3 and the operating parameters of the system such as the frequency and field strength of the upwardly travelling levitating electromagnetic field are selected so that there is a minimum annular gap such as indicated at 22 between the exterior surfaces of the liquid metal column 23 and the interior surfaces of tubular casting vessel 19 in the solidification region defined by the interface 24. This is true below the point where solidification of the liquid metal column results in shrinkage of the column cross section area although such shrinkage is quite small. The gap indicated at 22 in FIG. 3 is schematic and not intended as an accurate representation of the location or the magnitude of the dimensions of this annular gap. This gap, if allowed to become too large due to the containment effect produced by the upwardly travelling levitating electromagnetic field in the solidification region and just below it, could seriously impair effective heat transfer between the liquid metal column 23 and the tubular casting vessel/heat exchanger 19, 21. This is due to the fact that there is a strong inverse relationship between field strength and heat removal rate. Consequently, the upwardly travelling, electromagnetic levitation field strength should be adjusted at the start of a casting operation so as to provide pressureless contact as defined above with minimum gap spacing in the solidification region consistent with good heat transfer in this critical region. Then the field strength should be maintained at this setting and should not be changed during the course of the casting operation even though the rate of movement (line speed) of the liquid metal column through the levitator tube assembly and outgoing solidified metal product might be changed.

From the standpoint of a practical continuous casting process, the temperature of the solidified rod product is quite critical and must be maintained within a relatively narrow range. For example, if the cast rod product is copper and is much above 1,000 degrees Centigrade (white hot) it will be too weak to support itself and transmit the tensile forces needed to move the rod from the casting operation in levitator tube assembly 35 through the optionally employed prequenching and precooling chambers 36A, 36 via withdrawal rolls 37, 38. On the other hand, if the rod temperature is less than about 850 degrees Centigrade, it will be too cold for the "hot" rolling which optionally may be provided by tandem rolls 39, 41 if this is desired to create a fine grain, homogenous structure which is optimum for subsequent cold drawing (or cold working) of the solidified metal. There is a considerable advantage from the standpoint of overall system cost and process simplicity to eliminate the hot rolling apparatus, if possible. Fortunately and unexpectedly, the intense agitation and stirring action of the electromagnetic levitation field results in cast rod having a moderate size grain structure that appears to be useable "as-is". For such applications it is adequate to just use a spray or mist-type cooler 36, 36A above the levitation coil/heat exchanger assembly 35 to "quench" the emerging solidified rod, and then feed the rod directly into a coiler or other take-up mechanism via withdrawal rolls 37 and 43.

Due to the above considerations, the recommended procedure is that the casting speed (i.e. line speed of movement of the liquid metal column through the levitator tube assembly 35) should be controlled by controlling the drive motors for the rod withdrawal rolls 37, 38 or 37, 43 as shown in FIG. 4. The levitation field strength and excitation frequency should be established at a value calculated for the particular size and resistivity of the metal being cast to give a levitation ratio in the range between 75% to 200% where levitation ratio is defined as the ratio of the levitation force per unit of length of the liquid metal to the weight per unit length of the liquid metal as expressed in U.S. Pat. No. 4,414,285 at the bottom of column 11 and the top of column 12. The excitation frequency is determined by the expression $F=36\rho/D^2$ as described and explained more fully in U.S. Pat. No. 4,414,285 where F is the frequency in kilohertz, $\rho$ is the resistivity in micro-ohm-cm, and D is the average rod diameter in millimeters. Thereafter, during the course of the run, both the excitation frequency chosen and the electromagnetic levitation field strength should be maintained and not changed during the run.

As noted above in the description of FIG. 3, the multi-turn coils 12A, 12B and 12C are fabricated from ordinary high temperature insulated wire. Since the wires would be carrying relatively modest currents, it is likely that they would not have to be cooled separately with their own liquid cooled heat exchanger arrangement although the provision of forced cooling air flow over the coils may be necessary. The slotted annular slug members 11 of course are in close proximity to the annular heat exchanger water jacket 21 and have a relatively large conducting cross section so that they can be maintained at a modest temperature despite the high currents flowing through them. The thickness of the slotted annular discs comprising annular slugs 11A, 11B and 11C can be adjusted over a wide range to enhance this capability. It is anticipated, however, that at least two to three discs per slotted annular slug multiturn coil arrangement for each phase would be employed in order to create a more uniform field around the central opening in which the tubular casting vessel/-heat exchanger 19, 21 is disposed.

The slots 15 formed in the discs comprising the slotted annular slugs do not have to be lined-up vertically, since the discs comprising the slug are insulated one from the other, but instead could be oriented from one disc to another in such a way that the overall field distortion (if any) resulting from the slots can be minimized. Further, it is believed apparent to those skilled in the art that the central opening within the slotted annular slug members 11A, 11B, 11C, etc., can be of any desired shape in cross section. For example, either oval, hexagonal or other desired cross sectional configuration could be used to cast solidified rod product of a similar cross section. In a similar manner, the outer periphery of the slotted annular slugs do not have to be circular in shape and could be oval, hexagonal, or other desired configurations.

The outer surfaces of the flux concentrator slotted annular slugs do not have to be smooth but in an effort to get better coupling to their respective multi-turn energizing windings, they could be provided with grooves cut annularly around the outer surface. If a single continuous multi-turn winding is to be used, a continuous spiral groove could be employed. Additionally, in accordance with good engineering practice, it may be desireable to make the multi-turn energizing coils 12A, 12B, 12C from one or a few layers of square or rectangularly cross section conductors instead of several layers of wound round conductors. This type of construction would minimize the effective air gap between the energizing coil and its associated flux concentrator slotted annular slug. Also, it could provide other benefits at higher energizing frequencys such as reduced capacitance. Energizing coils formed from rectangular cross section conductors, because of their larger effective conducting cross sections, also would have lower $I^2R$ heating losses than coils made from multiple turns of insulated round wires. The choice of insulation used in fabricating the multi-turn energizing coil conductors also is a matter of good engineering practice. For example, use of a high temperature wire enamel, polymeric coatings or tape, and other similar newly developed high temperature insulating materials conceivably could eliminate the need for or reduce the cost and complexity of cooling arrangements for the coil assemblies.

Other modifications and variations in the construction to the flux concentrator assembly will be suggested to those skilled in the art in the light of the above teachings. For example, it is possible to incorporate ferromagnetic material such as specially-shaped high temperature ferrite members in the construction of the primary multi-turn energizing coil slotted annular slug flux concentrator assembly. It is suspected that the electric field below the bottom coil in the levitator assembly, because of its distance from the interacting fields produced by the other coils, may act essentially like a single phase field that tends to repel the upward movement of the liquid metal column. By suitably fashioning and placing ferromagnetic ferrite members at the bottom of the stacked assembly, it may be possible to minimize the effect of this repulsion field. Further, if a central opening in the slotted annular slug member flux concentrator plate is employed having other than a circular cross section, suitably configured ferromagnetic ferrite material flux shaping members could be incorporated into the assembly along with the slotted annular slug members in order to "shape-up" the electromagnetic field produced by the flux concentrator assembly into a desired field pattern. Such an arrangement will be described hereafter with relation to FIG. 7. Another method of field shaping might be to cut out segments or additional field shaping slots around either the inner or outer peripheries of the slotted annular slug members whereby currents flowing in an undesired manner are forced into current paths providing a more optimum magnetic field configuration. Removing segments or additional slots of the slotted annular slug member for field shaping purposes can be achieved but at the expense of lost field and an increase the electrical impedance of the plates. Hence, this method of field shaping might be less desireable than that employing ferromagnetic ferrite field shaping members even though ferromagnetic components are known to be non-linear in high frequency fields.

From the standpoint of providing a practical operating facility of good engineering design, it would be most desireable to provide the new and improved levitation coil assembly with a design such that one set of primary multi-turn energizing coils having a fixed cross sectional internal opening could be used with a variety of slotted annular slug flux concentrator-heat exchanger assemblies having various different central opening diameters but a constant outer cross sectional configuration and area. A user of the GELEC process incorporating the new and improved levitation coil assembly constructed in this manner then could change over from making 8 mm diameter rod, for example, to 5 mm diameter rod by only changing the internal slotted annular slug flux concentrator-heat exchanger assembly and not have to remove or alter the primary, multi-turn, outer energizing coils themselves.

Figure 7:
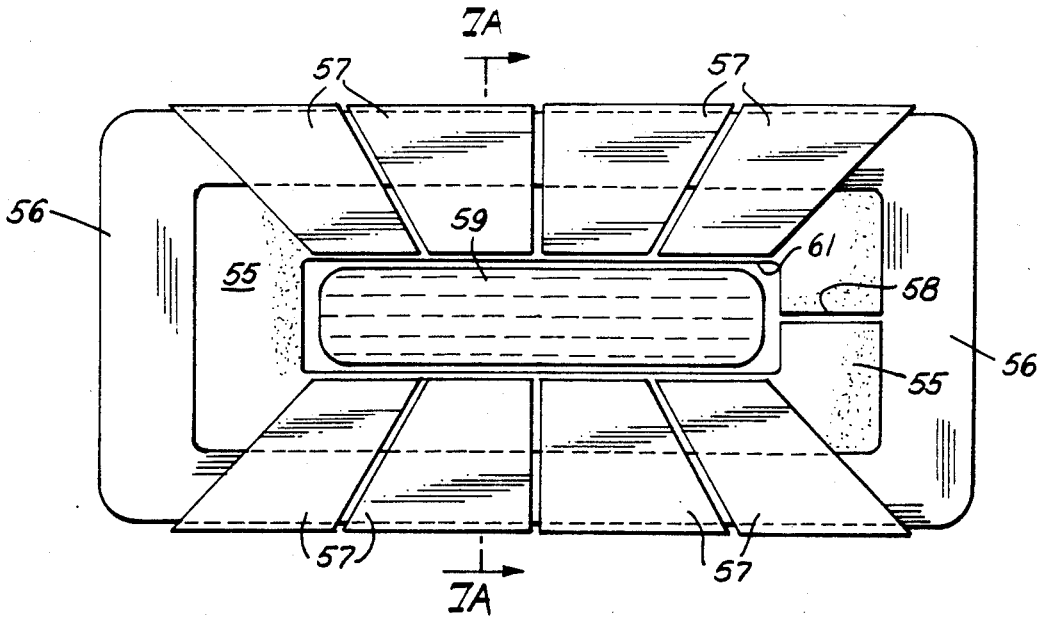
FIGS. 7, 7A and 7B illustrate still another embodiment of the invention suitable for use in casting flat plate having a rectangular cross section.
Figure 7A:
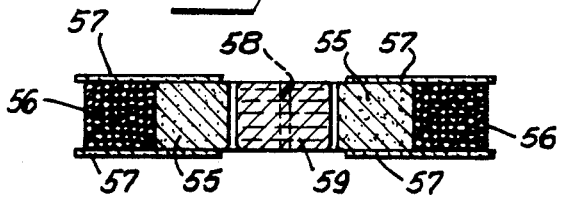
Figure 7B:
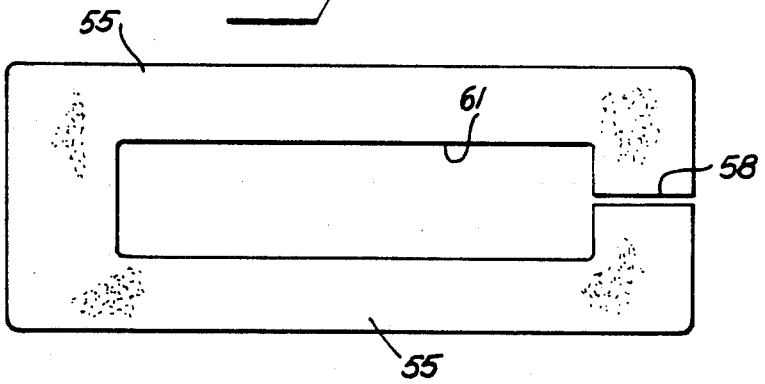

In a preceeding paragraph it was indicated that the cross sectional opening provided in the center of the flux concentrator slug members could be other than circular in cross section. FIGS. 7, 7A and 7B of the drawings illustrate one such arrangement. FIG. 7 is a top planar view of only one phase winding of an installation suitable for use in fabricating plates from molten metal having a rectangular cross section as shown at 59 in FIGS. 7 and 7A. The rectangular cross section molten metal plate 59 is formed by reason of the generally rectangular flux concentrator slug member 55 having an elongated rectangular central opening 61 and a gap formed therein as shown at 58 in both FIGS. 7 and 7B of the drawings. The rectangular-shaped flux concentrator 55 is disposed within an outer primary multi-turn coil 56 best seen in FIGS. 7 and 7B. In order to better shape the magnetic field flux emanating from the flux concentrator slug member 55, a plurality of nonconducting, thin ferrite plates shown at 57 are disposed over and under the multi-turn primary coil 58 and flux concentrator slug member 55 subassembly as best shown in FIG. 7A. The thin ferrite plate members 57 have specially-shaped trapezoidal configurations as best seen in FIG. 7 for concentrating the magnetic flux in the longer dimension flat section of the molten metal plate 59 whereby the plate is provided with a generally flat rectangular cross section as illustrated in FIG. 7. Similar to the embodiment of the invention shown in FIGS. 3 and 4, a graphite lined, water cooled heat exchanger that comprises the casting vessel/heat exchanger 19, 21 is positioned between the flux concentrator slotted annular slug assembly 11A, 11B and 11C and the liquid metal column 23 being levitated. It will be appreciated therefor that relatively heavy currents will be induced in the liquid cooled heat exchanger in this construction and will result in rather substantial losses. In order to avoid such losses, a preferred embodiment of the invention is provided which is illustrated in FIGS. 5 and 6 of the drawings.

From a consideration of FIG. 6, it will be appreciated that the slotted annular slug flux concentrator plate asssembly shown generally at 11 in FIG. 6 is mechanically strong and rigid. If the flux concentrator slugs 11 are made of a metal having good heat conductivity but also capable of providing electrical isolation between the respective slug members, such an assembly would also be capable of transfering a considerable amount of heat to a liquid coolant flowing from the upper and lower electrically insulating header manifolds 33 and 34 down through a series of cooling apertures shown at 51 in FIG. 5 formed in each of the slug members 11. In this arrangement the tubular casting vessel 19 could comprise a refractory lining vessel such as graphite, zirconia, TZM and the like which is press fit directly into the inner opening 14 of the stacked array of slotted annular slugs 11A, 11(-B'), 11C, etc., that form a liquid cooled slotted annular slug flux concentrator assembly 35. Assembly 35 functions in the same manner as the flux concentrator assembly 35 described with relation to FIG. 4. However, in the FIGS. 5 and 6 assembly, the reduced spacing between the inner periphery of the slotted annular slug flux concentrator assembly 35 and the levitated liquid metal column 23 contained within the tubular casting vessel portion 19, greatly improves the electromagnetic coupling to liquid metal column 23 and eliminates the power lost by eddy currents induced in the heat exchanger assembly 21 of the FIG. 3 assembly. Further, by elimination of the annular heat exchanger member 21 of the FIG. 3 assembly, the cost of the overall assembly is reduced.

It should be further noted with respect to FIG. 6 that each of the slotted annular slug flux concentrators 11A, 11(-B'), 11C, etc., comprises a relatively thick monolithic slug whose axial dimensions are substantially equal to the axial dimension of its associated primary multi-turn driving coil such as 12A, 12(-B'), 12C, etc. These multi-turn coils are respectively excited from a three phase current supply and controller 26 and are connected thereto in the manner described more fully above and with respect to FIG. 5 of the drawings of U.S. Pat. No. 4,414,285 referenced above.

The improved levitator coil and heat exchanger assembly should be designed so that the slotted annular slug members are press fit within the surrounding associated primary multi-turn driving coil and still are electrically insulated from their associated primary multi-turn coil, the tubular refractory liner 19 and from adjacent slug members. For this purpose, it is anticipated that the slotted annular slug members 11 employed in the FIG. 6 arrangement would be fabricated from a soft aluminum material such as aluminum 1100. The cooling passageway 51 could be drilled or cast therein and each of the annular slug members then anodized by known electrochemical means. The anodizing treatment will result in the production of an aluminum oxide film being grown around all of the exposed surfaces of the slug to a thickness of about 2/1000 of an inch. The aluminum oxide film thus provided will electrically insulate each of the slotted annular slug members one from the other as well as from its associated primary multi-turn driving coil and the tubular refractory liner 19. The stacked array of slotted annular slug members 11A, 11(-B'), 11C, etc., is pressed together with cooling passageways 51 aligned and forming liquid tight seals between the respective slug members. Since the interior surfaces of the cooling passageways 51 likewise will have an aluminum oxide insulating surface grown therein, the liquid coolant will be unable to electrically short out between adjacent slug members. If desired, copper, aluminum or other tubes could be inserted into the aligned openings 51 and then expanded to provide a press fit, thereby further insuring that no leakage occurs between adjacent slug members. The anodized coating of aluminum oxide prevents the copper or other conductive tubes from shorting between the slotted annular slug members.

From the above description it will be seen that the individual slotted annular slug flux concentrator members will be electrically insulated one from the other by the anodized aluminum coating so that the large flux producing currents induced around the periphery of the inner openings 14 thereof can be individually controlled to produce the desired upwardly travelling electromagnetic levitation field required to practice the GELEC (TM) process. Further, it is known that the thermal resistivity of thin aluminum oxide anodized coating is minimal because of its thinness. Thus, the cooling characteristics of the assembled levitating coil structure are comparable to or perhaps even better that the cooling provided with the assembly shown in FIG. 3. If desired, other aluminum materials such as aluminum 2024 could be employed in forming the slugs although such material is known to have a somewhat higher resistivity than aluminum 1100 and would lead to somewhat higher losses during operation of the levitator coil assembly.

If it is determined that an improved levitation field producing assembly such as that shown in FIGS. 5 and 6 does not provide adequate cooling for certain products, it is possible to provide additional cooling to that provided by passageways 51. For that matter, it may be necessary to provide such additional fluid cooling passageways in the slotted annular slug members of the arrangement shown in FIG. 3, although one of the expected benefits of the use of the flux concentrator slotted annular slug members is to eliminate the need for water cooled conductors in the levitation coil assembly. However, it may prove necessary for the flux concentrator slotted annular slug member assembly of FIG. 3 to be cooled either by air or water or some other liquid coolant. If such cooling is needed, cooling channels such as those shown in FIG. 5 could be incorporated into the slotted annular slug members of FIG. 3. Such cooling channels should be positioned several electrical skin depths away from the inner and outer peripheries of the respective slug members so as not to impede or distort the flow of the levitation field producing currents.

The above consideration may ultimately limit the number of cooling passageways, such as 51, that can be formed in the respective slotted annular flux concentrating slug members. Should that prove to be true, and additional cooling still be required to practice the GELEC (TM) process, then it is possible that the slug members could be hollowed out and provided with annular cooling passageways of the type described with relation to FIGS. 9–16 of U.S. Pat. No. 3,872,379, for example. The annular fluid passageways thus formed could be interconnected between the stacked assemblage of slotted annular slug members via interconnecting apertures such as shown at 51 in FIG. 5. It may be possible to eliminate the need for the casting vessel 19 liner by suitable design and use of anodized flux concentrator slug members 11. Other modifications and variations required to produce the desired amount of cooling will be suggested to those skilled in the art in the light of this disclosure.

INDUSTRIAL APPLICABILITY

This invention describes an electromagnetic levitation casting apparatus having an improved levitator coil assembly for use in the continuous casting of metal products of long length such as rod made from copper, aluminum, nickle and various alloys of these and other metals.

Having described several embodiments of an electromagnetic levitation casting apparatus having improved levitation coil assembly constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

What is claimed is:

1. Continuous casting apparatus comprising an elongated tubular casting vessel disposed in upright position to receive liquid metal for solidifiction, means for delivering liquid metal into a lower portion of the vessel, heat exchange means associated with the vessel for cooling and solidifying liquid metal therein, means for removing solidified metal from an upper portion of the vessel, and electromagnetic levitation field producing means disposed around the vessel along a portion of its length for reducing the hydrostatic head of the column and maintaining a predetermined dimensional relationship between the outer surface of the liquid metal column and the interior surrounding surfaces of the casting vessel to thereby effect maximum obtainable heat transfer between the liquid metal column and the casting vessel while simultaneously reducing gravitational, frictional and adhesive forces of the liquid metal column to a minimum, said electromagnetic levitation field producing means including magnetic field concentrating means comprised by a compact, closely stacked array of slotted annular slugs surrounding the portion of the length of the tubular casting vessel within which the liquid metal column is to be levitated, each of the slugs being insulating supported within the compact array, one from the other by a thin insulating coating and inductively coupled to a respective electromagnetic field producing coil having a large number of turns surrounding the slug whereby each slug serves to concentrate the magnetic field produced by the coil to substantially the interior cross sectional area of the portion of the tubular casting vessel it surrounds and functions as a current step-up transformer.

2. The apparatus of claim 1 in which the electromagnetic levitation field producing means includes a plurality of electromagnetic coils for connection to successive phases of a polyphase alternating electric current source for producing an upwardly travelling alternating electromagnetic field and at least one slotted annular slug and respective electromagnetic field producing coil magnetic field concentrating means is provided for each of the successive phases with the slotted annular slugs for each of the phases being electrically insulated one from the other.

3. The apparatus of claim 1 wherein the slotted annular slug inductively coupled to the electromagnetic field producing coil for each phase comprises a monolithic structure having an anodized insulating surface formed thereon.

4. The apparatus of claim 2 wherein the slotted annular slugs are arranged within the compact stacked array in a manner such that the open slots of the respective slotted annular slugs are not vertically aligned with respect to each other and a uniform balanced electromagnetic field is produced by the compact stacked array of the slotted annular slugs.

5. The apparatus of claim 1 wherein the heat exchange means comprises an annularly-shaped fluid cooled heat exchanger immediately surrounding the tubular casting vessel in the region thereof where said electromagnetic levitation field producing means is disposed, said tubular casting vessel and annularly-shaped fluid cooled heat exchanger being positioned in the central opening of the slotted annular slugs comprising the magnetic flux concentrators for the electromagnetic field producing means, and means for continuously supplying cooling fluid to the annularly-shaped fluid cooled heat exchanger.

6. The apparatus of claim 1 wherein the heat exchange means is comprised in part by the slotted annular slugs which immediately surround and are in mechanical and thermally conductive contact with the outer surfaces of the tubular casting vessel in the region thereof where said electromagnetic levitation field producing means is disposed but are electrically insulated therefrom, said slotted annular slugs having passageways formed therein for the passage of cooling fluid, and means for continuously supplying cooling fluid to the cooling passageways formed in said slotted annular slugs.

7. The apparatus of claim 2 in which the tubular casting vessel is a tube of refractory material of substantially uniform inside diameter and further includes a crucible to contain molten metal communicating with the lower end of the tubular casting vessel, means associated with the crucible to establish and move a column of liquid metal upwardly into the tubular casting vessel to a level above the lower end of the electromagnetic levitation field producing means, means for joining the lower end of a starting metal rod to the upper end of the molten liquid metal column within the electromagnetic levitation field, means for maintaining the value of the electromagnetic field so that the cross sectional dimension of the liquid metal column is sufficiently large to preclude formation of a substantial gap between the outer surface of the column and the interior surrounding surfaces of the casting vessel, means independent from said electromagnetic levitation field producing means for moving the liquid metal column upwardly through the casting vessel, and means for controlling the rate of production of solidified metal product by controlling the rate of removal of the solidified metal product from the upper portion of the tubular casting vessel.

8. The apparatus of claim 7 in which the polyphase alternating electric current source is a multi-phase generator whose output power and frequency can be variably controlled to produce a uniform and balanced upwardly travelling electromagnetic levitating force in accordance with the type and size of metal being cast.

9. The apparatus of claim 8 wherein the slotted annular slug inductively coupled to the electromagnetic field producing coil for each phase comprises a monolithic structure having an anodized insulating surface formed thereon.

10. The apparatus of claim 8 wherein the heat exchange means comprises an annularly-shaped fluid cooled heat exchanger immediately surrounding the tubular casting vessel in the region thereof where said electromagnetic levitation field producing means is disposed, said tubular casting vessel and annularly-shaped fluid cooled heat exchanger being positioned in the central opening of the slotted annular slugs comprising the magnetic flux concentrators for the electromagnetic field producing means, and means for continuously supplying cooling fluid to the annularly-shaped fluid cooled heat exchanger.

11. The apparatus of claim 8 wherein the heat exchange means is comprised in part by the slotted annular slugs which immediately surround and are in mechanical and thermally conductive contact with the outer surfaces of the tubular casting vessel in the region thereof where said electromagnetic levitation field producing means is disposed but are electrically insulated therefrom, said slotted annular slugs having passageways formed therein for the passage of cooling fluid, and means for continuously supplying cooling fluid to the cooling passageways formed in said slotted annular slugs.

12. The apparatus of claim 8 wherein the slotted annular slugs are arranged within the compact stacked array in a manner such that the open slots of the respective slotted annular slugs are not vertically aligned with respect to each other and a uniform balanced electromagnetic field is produced by the compact stacked array of slotted annular slugs.

13. The apparatus of claim 12 wherein the heat exchange means comprises an annularly-shaped fluid cooled heat exchanger immediately surrounding the tubular casting vessel in the region thereof where said electromagnetic levitation field producing means is disposed, said tubular casting vessel and annularly-shaped fluid cooled heat exchanger being positioned in the central opening of the slotted annular slugs comprising the magnetic flux concentrators for the electromagnetic field producing means, and means for continuously supplying cooling fluid to the annularly-shaped fluid cooled heat exchanger.

14. The apparatus of claim 12 wherein the heat exchange means is comprised in part by the slotted annular slugs which immediately surround and are in mechanical and thermally conductive contact with the outer surfaces of the tubular casting vessel in the region thereof where said electromagnetic levitation field producing means is disposed but are electrically insulated therefrom, said slotted annular slugs having passageways formed therein for the passage of cooling fluid, and means for continuously supplying cooling fluid to the cooling passageways formed in said slotted annular slugs.

15. The apparatus of claim 12 further including means for precooling the solidified metal product as it emerges from the upper portion of the casting vessel, means for rolling the product to a desired dimension and means for cooling the rolled product to an ambient temperature for storage and subsequent use.

16. The apparatus of claim 12 further including means for precooling the solidified metal product and thereafter cooling the precooled solidified product to an ambient temperature for storage and subsequent use.

17. In a continuous casting apparatus including an elongated tubular casting volume disposed in an upright position to receive liquid metal for solidification, means for delivering liquid metal into a lower portion of the casting volume, heat exchange means associated with the casting volume for cooling and solidifying liquid metal therein, means for removing solidified metal product from an upper portion of the casting volume, and electromagnetic levitation field producing means disposed around the casting volume along a portion of its length for producing an electromagnetic levitation field that reduces the hydrostatic head of the column and maintains the liquid metal column in a substantially weightless condition while simultaneously maintaining a predetermined dimensional relationship between the outer surface of the liquid metal column and the interior surrounding surfaces of the casting volume to thereby assure optimum heat transfer between the liquid metal column and the casting volume while simultaneously reducing frictional, adhesive and gravitational forces acting on the column to a minimum; the improvement wherein the electromagnetic levitation field producing means includes magnetic field concentrating means comprised by a compact, closely stacked array of slotted annular slugs surrounding the portion of the length of the tubular casting volume within which the liquid metal column is to be levitated, each of the slugs being insulating supported within the compact array one from the other by a thin insulating coating and inductively coupled to a respective electromagnetic field producing coil having a large number of turns surrounding the slug whereby each slug serves to concentrate the magnetic field produced by its coil to substantially the interior cross sectional area of the portion of the tubular casting volume it surrounds and functions as a current step-up transformer.

18. The apparatus of claim 17 in which the electromagnetic levitation field producing means includes a plurality of electromagnetic coils for connection to successive phases of a polyphase alternating electric current source for producing an upwardly travelling alternating electromagnetic field and at least one slotted annular slug and respective electromagnetic field producing coil magnetic field concentrating means is provided for each of the successive phases with the slotted annular slugs for each of the phases being electrically insulated one from the other.

19. The apparatus of claim 18 wherein the slotted annular slug inductively coupled to the electromagnetic field producing coil for each phase comprises a monolithic structure having an anodized insulating surface formed thereon.

20. The apparatus of claim 18 wherein the slotted annular slugs are arranged within the compact stacked array in a manner such that the open slots of the respective slotted annular slugs are not vertically aligned with respect to each other and a uniform balanced electromagnetic field is produced by the compact stacked array of slotted annular slugs.

21. The apparatus of claim 20 wherein the heat exchange means comprises an annularly-shaped fluid cooled heat exchanger immediately surrounding the tubular casting volume in the region thereof where said electromagnetic levitation field producing means is disposed, said tubular casting volume and annularly-shaped fluid cooled heat exchanger being positioned in the central opening of the slotted annular slugs comprising the magnetic flux concentrators for the electromagnetic field producing means, and means for continuously supplying cooling fluid to the annularly-shaped fluid cooled heat exchanger.

22. The apparatus of claim 20 wherein the heat exchange means is comprised in part by the slotted annular slugs which immediately surround and are in thermally conductive relationship with the outer regions of the tubular casting volume in the region thereof where said electromagnetic levitation field producing means is disposed but are electrically insulated therefrom, said slotted annuular slugs having passageways formed therein for the passage of cooling fluid, and means for continuously supplying cooling fluid to the cooling passageways formed in said slotted annular slugs.

23. The apparatus of claim 20 further including means for establishing the strength of the electromagnetic field to provide a levitation ratio between 75% and 200% of the weight per unit length of liquid metal and means for adjusting the frequency value of the frequency of excitation of the electromagnetic field producing means over a range of values including an optimum frequency value $F=36\rho/D^2$ where F is the frequency in kilohertz, $\rho$ is the resistivity in micro-ohm-cm of the liquid metal column and D is the average diameter in millimeters of a solidified metal product produced by the apparatus, a crucible to contain a bath of molten liquid metal communicating with the lower end of the tubular casting volume, means associated with the crucible to establish and move a column of liquid metal upwardly into the lower end of the tubular casting volume to a level above the lower end of the electromagnetic levitation field producing means, means for joining the lower end of a starting metal rod to the upper end of the molten liquid metal column within the electromagnetic field of the electromagnetic levitation field producing means, control means for controlling the magnitude of the current and hence the magnetic field strength produced by the electromagnetic field producing means to thereby control the levitation ratio produced by the apparatus, and means for controlling the rate of production of solidified metal product by controlling the rate of removal of the solidified metal product from the upper portion of the casting volume.

24. The apparatus of claim 23 wherein the slotted annular slug inductively coupled to the electromagnetic field producing coil for each phase comprises a monolithic structure having an anodized insulating surface formed thereon.

25. The apparatus of claim 23 wherein the heat exchange means comprises an annularly-shaped fluid cooled heat exchanger immediately surrounding the tubular casting volume in the region thereof where said electromagnetic levitation field producing means is disposed, said tubular casting volume and annularly-shaped fluid cooled heat exchanger being positioned in the central opening of the slotted annular slugs comprising the magnetic flux concentrators for the electromagnetic field producing means, and means for continuously supplying cooling fluid to the annularly-shaped fluid cooled heat exchanger.

26. The apparatus of claim 23 wherein the heat exchange means is comprised in part by the slotted annular slugs which immediately surround and are in thermally conductive relationship with the outer surfaces of the tubular casting volume in the region thereof where said electromagnetic levitation field producing means is disposed but are electrically insulated therefrom, said slotted annuular slugs having passageways formed therein for the passage of cooling fluid, and means for continuously supplying cooling fluid to the cooling passageways formed in said slotted annular slugs.

27. The apparatus of claim 23 wherein the slotted annular slugs are arranged within the compact stacked array in a manner such that the open slots of the respective slotted annular slugs are not vertically aligned with respect to each other to provide a uniform and balanced electromagnetic field by the stacked array of slotted annular slugs.

28. The apparatus of claim 27 wherein the electromagnetic field producing coil for each phase has a standard size and shape central opening into which a plurality of differently designed slotted annular slug members having a standard size and shape external configuration can fit but which have different size and/or shaped central openings which define the space for accomodating the tubular casting volume.

29. The apparatus of claim 20 wherein the electromagnetic field producing coil for each phase has a standard size and shape central opening into which a plurality of differently designed slotted annular slug members having a standard size and shape external configuration can fit but which have different size and/or shaped central openings which define the space for accomodating the tubular casting volume.

30. The apparatus of claim 28 further including means for precooling the solidified metal product as it emerges from the upper portion of the casting vessel, means for rolling the product to a desired dimension and means for cooling the rolled product to an ambient temperature for storage and use.

31. The apparatus of claim 28 further including means for precooling the solidified metal product and thereafter cooling the precooled solidified product to an ambient temperature for storage and use.

32. The apparatus of claim 20 further including means for precooling the solidified metal product as it emerges from the upper portion of the casting vessel, means for rolling the product to a desired dimension and means for cooling the rolled product to an ambient temperature for storage and use.

33. The apparatus of claim 20 further including means for precooling the solidified metal product and thereafer cooling the precooled solidified product to an ambient temperature for storage and use.

* * * * *